US011327844B1

(12) United States Patent
Aquino et al.

(10) Patent No.: US 11,327,844 B1
(45) Date of Patent: May 10, 2022

(54) AUTOMATED CLOUD RECOVERY TO PROVIDE A FULL USABLE APPLICATION IMAGE

(71) Applicant: EMC IP HOLDING COMPANY LLC, Hopkinton, MA (US)

(72) Inventors: Francisco Aquino, Marlborough, MA (US); Kenneth Byrne, Knockraha (IE); Warren Fleury, Ballincollig (IE); Thiago Santos, Cork City (IE); Deepak Vokaliga, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 57 days.

(21) Appl. No.: 17/084,691

(22) Filed: Oct. 30, 2020

(51) Int. Cl.
*G06F 12/00* (2006.01)
*G06F 11/14* (2006.01)
*G06F 3/06* (2006.01)

(52) U.S. Cl.
CPC .......... *G06F 11/1435* (2013.01); *G06F 3/067* (2013.01); *G06F 3/0619* (2013.01); *G06F 3/0653* (2013.01); *G06F 11/1451* (2013.01); *G06F 11/1464* (2013.01); *G06F 11/1469* (2013.01); *G06F 2201/84* (2013.01)

(58) Field of Classification Search
CPC .. G06F 11/1435; G06F 3/0619; G06F 3/0653; G06F 3/067; G06F 11/1451; G06F 11/1464; G06F 11/1469; G06F 2201/84
See application file for complete search history.

(56) References Cited

U.S. PATENT DOCUMENTS

| | | | |
|---|---|---|---|
| 2007/0162690 A1* | 7/2007 | Xing | G06F 11/1435 711/111 |
| 2008/0183993 A1* | 7/2008 | Nagata | G06F 11/1458 711/E12.103 |
| 2009/0313447 A1* | 12/2009 | Nguyen | G06F 9/45558 718/1 |
| 2012/0084261 A1* | 4/2012 | Parab | G06F 11/1458 707/674 |
| 2012/0203742 A1* | 8/2012 | Goodman | G06F 11/1469 707/649 |
| 2015/0112944 A1* | 4/2015 | Wu | H04L 67/10 707/652 |
| 2016/0274982 A1* | 9/2016 | Lad | G06F 11/1451 |
| 2019/0303246 A1* | 10/2019 | Gokhale | G06F 11/26 |
| 2019/0311040 A1* | 10/2019 | Nayak | G06F 11/1469 |
| 2019/0332410 A1* | 10/2019 | Chopra | G06F 9/4868 |

* cited by examiner

*Primary Examiner* — John A Lane
(74) *Attorney, Agent, or Firm* — Anderson Gorecki LLP

(57) ABSTRACT

A storage array creates snapshots of each of a plurality of devices of a storage group associated with a production device on which active application data is logically stored. Metadata that indicates associations between the snapshots and the devices is stored on cloud storage with the snapshots as a snapset object. A program running on a management station used the snapset metadata to automatically create new devices on which to recover the snapshots on a selected storage array and uses the snapset metadata to cause the snapshots to be automatically written from the cloud storage system to the new devices on the selected storage array.

20 Claims, 5 Drawing Sheets

| TDEV (114) Snapshot 254 | | TDEV (116) Snapshot 256 | | TDEV (118) Snapshot 258 | |
|---|---|---|---|---|---|
| SA ID 260 | SG UUID 262 | Snap (254) size 264 | Snap (256) size 266 | Snap (258) size 268 | |
| Snap (254) name 270 | | Snap (256) name 272 | Snap (258) name 274 | | |
| Snap (254) ID 276 | | Snap (256) ID 278 | Snap (258) ID 280 | | |
| Snapset ID 282 | | Volume WWNs 284 | Timestamp 286 | | |
| SG nice name 288 | | User provider mount point marker 290 | Original source volume number 292 | | |

Snapset Object With Metadata
124

Figure 4

AUTOMATED CLOUD RECOVERY TO PROVIDE A FULL USABLE APPLICATION IMAGE

TECHNICAL FIELD

The subject matter of this disclosure is generally related to electronic data storage and more particularly to recovery of snapped application images.

BACKGROUND

High capacity data storage systems such as storage area networks (SANs) are used to maintain large data sets and contemporaneously support multiple users. A storage array, which is an example of a SAN, includes a network of interconnected compute nodes that manage access to data stored on arrays of drives. The data is typically used by "host applications" that run on servers known as "hosts." The drives are not discoverable by the hosts, so the compute nodes create a logical production volume that is discoverable by the hosts. Examples of host applications may include, but are not limited to, databases and other software for email, accounting, manufacturing, inventory control, and a wide variety of other business processes. Separate logical production volumes may be created for each host application supported by the storage array.

A variety of techniques may be implemented by the storage system to avoid data loss, maintain data availability, and protect against data corruption. One such technique is creation of point-in-time copies of a data set. Creating a complete copy of a large data set requires a significant amount of time and resources so it is common practice to create smaller incremental updates known as snapshots or "snaps." Each snap only represents the changes made to the data set since some prior point in time, e.g. and without limitation since creation of the previous snap. Consequently, snaps take less time and resources to generate than complete copies. Snaps enable recreation of a prior point in time state of the data set.

SUMMARY

In accordance with some aspects a method for creating and recovering an application image comprises creating, with a storage array, a snapshot of each of a plurality of devices of a storage group associated with a production device on which active application data is logically stored, thereby creating a plurality of the snapshots, each of the snapshots representing device state at a same point in time, creating metadata that indicates associations between ones of the snapshots and ones of the devices on which the active application data is stored, and creating a snapset comprising all the snapshots and the metadata, storing the snapset on a cloud storage system, and with a third network node using the snapset metadata to automatically create new devices on which to recover the snapshots on a selected storage array and using the snapset metadata to cause the snapshots to be automatically written from the cloud storage system to the new devices on the selected storage array.

In accordance with some aspects a storage system comprises: a storage array configured to create a snapshot of each of a plurality of devices of a storage group associated with a production device on which active application data is logically stored, thereby creating a plurality of the snapshots, each of the snapshots representing device state at a same point in time, the storage array further configured to create metadata that indicates associations between ones of the snapshots and ones of the devices on which the active application data is stored and create a snapset comprising all the snapshots and the metadata; a cloud storage system configured to store the snapset; and a third network node configured to use the snapset metadata to automatically create new devices on which to recover the snapshots on a selected storage array and use the snapset metadata to cause the snapshots to be automatically written from the cloud storage system to the new devices on the selected storage array.

In accordance with some implementations a computer-readable storage medium stores instructions that when executed by a computer cause the computer to perform a method for using a computer system to create and recover an application image, the method comprising, with a storage array: creating a snapshot of each of a plurality of devices of a storage group associated with a production device on which active application data is logically stored, thereby creating a plurality of the snapshots, each of the snapshots representing device state at a same point in time; creating metadata that indicates associations between ones of the snapshots and ones of the devices on which the active application data is stored; and creating a snapset comprising all the snapshots and the metadata; with a cloud storage system: storing the snapset; with a third network node: using the snapset metadata to automatically create new devices on which to recover the snapshots on a selected storage array; and using the snapset metadata to cause the snapshots to be automatically written from the cloud storage system to the new devices on the selected storage array.

All examples, aspects and features mentioned in this document can be combined in any technically possible way. Other aspects, features, and implementations may become apparent in view of the detailed description and figures.

BRIEF DESCRIPTION OF THE FIGURES

FIG. 4 illustrates the snapset object and metadata in greater detail.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
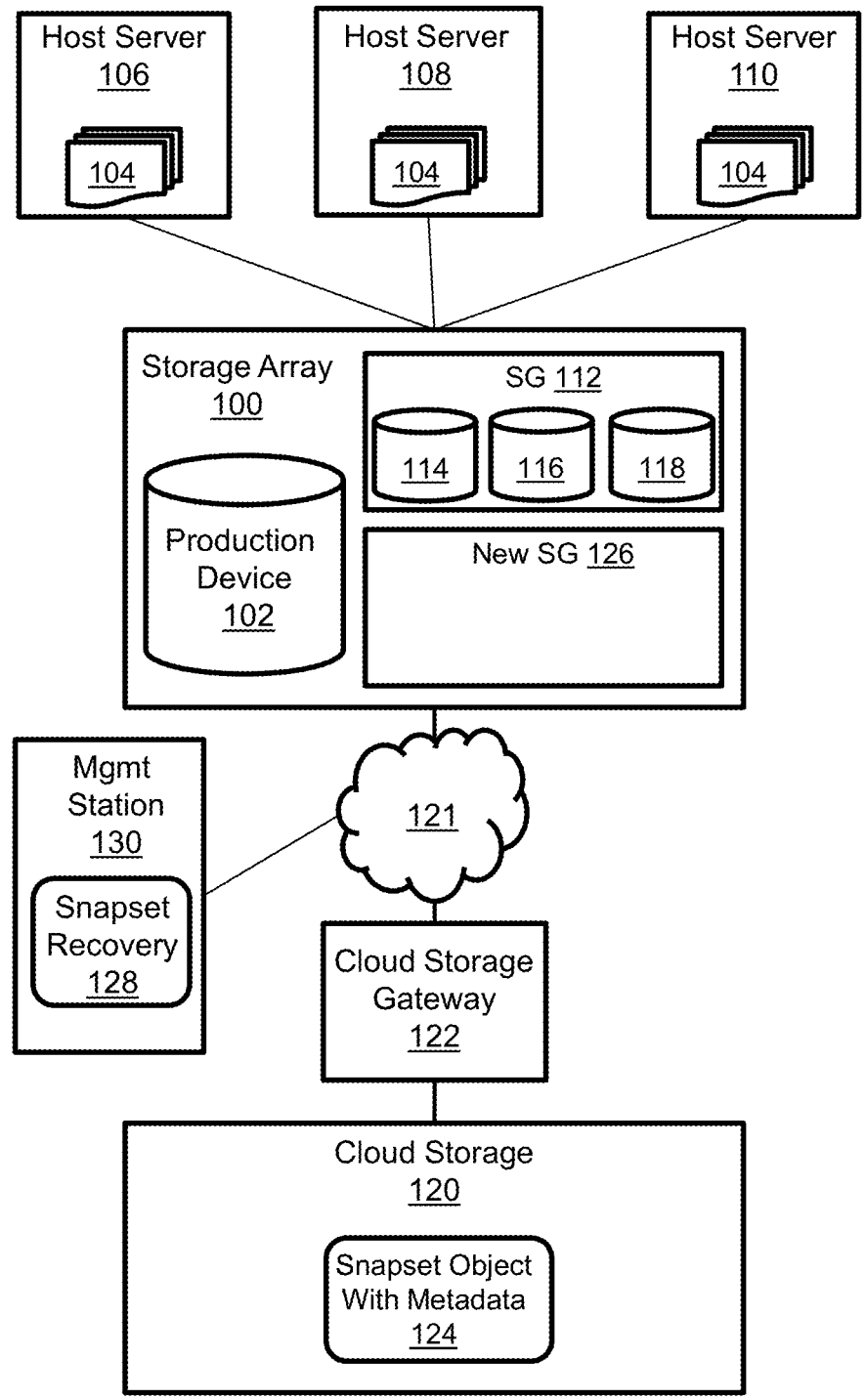
FIG. 1 illustrates creation and recovery of a snapset associated with a production device.

FIG. 1 illustrates creation and recovery of a snapset associated with a production device. A storage array 100 creates a logical production device 102 that is used to store a full active copy of host application data (aka, an application image) that is used by instances of a host application 104 running on host servers 106, 108, 110. The production device 102 is created by the storage array using storage resources of a storage group 112. The storage group 112 includes multiple thinly provisioned devices (TDEVs) 114, 116, 118 that are logical storage volumes. A snapshot of the production device 102 is created by generating individual snapshots of each of the TDEVs 114, 116, 118 and associated metadata. The set of snapshots of the TDEVs is referred to as a snapset. The snapset is sent to cloud storage 120 via a network 121 and cloud storage gateway 122. The snapset is stored on the cloud storage as a single snapset object with metadata 124. The metadata describes the data of the snapped TDEVs and also describes how to recover the snapset to a new storage group 126 on the storage array 100 (or other storage node). Recovery of the snapset object is performed by a snapset recovery program 128 that runs on a management station 130. The metadata and snapset recovery program provide automated recovery and reduce the likelihood of error.

Cloud storage 120 and the storage array 100 are distinct types of storage systems. Cloud storage exhibits greater data access latency than the storage array and may be unsuitable for active data sets. Cloud storage is used to reduce per-bit storage costs in situations where high-performance capabilities are not required, e.g. data backup and storage of inactive or infrequently accessed data. The cloud storage gateway 122 enables the storage array 100 to use the data storage resources of cloud storage 120 by functioning as an intermediary device. More particularly, the cloud storage gateway converts IOs between a form used by the storage array and a form used by storage servers of the cloud storage. Cloud storage and the storage array are configured to utilize different protocols for IOs. For example, and without limitation, the storage array may utilize a transport layer protocol such as Fibre Channel, iSCSI (internet small computer system interface) or NAS (Network-Attached Storage) protocols such as NFS (Network File System), SMB (Server Message Block), CIFS (Common Internet File System) and AFP (Apple Filing Protocol). In contrast, the cloud storage may utilize any of a variety of different non-standard and provider-specific APIs (Application Programming Interfaces) such as AWS (Amazon Web Services), Dropbox, OpenStack, Google Drive/Storage APIs based on, e.g., JSON (JavaScript Object Notation). In response to receipt of an iSCSI format IO command from the storage array, the cloud storage gateway converts that IO into a format, for example and without limitation OpenStack, that can be processed by cloud storage, thereby providing a corresponding OpenStack IO. The cloud storage gateway can also convert messages from the cloud storage format to the host/storage array format.

Figure 2:
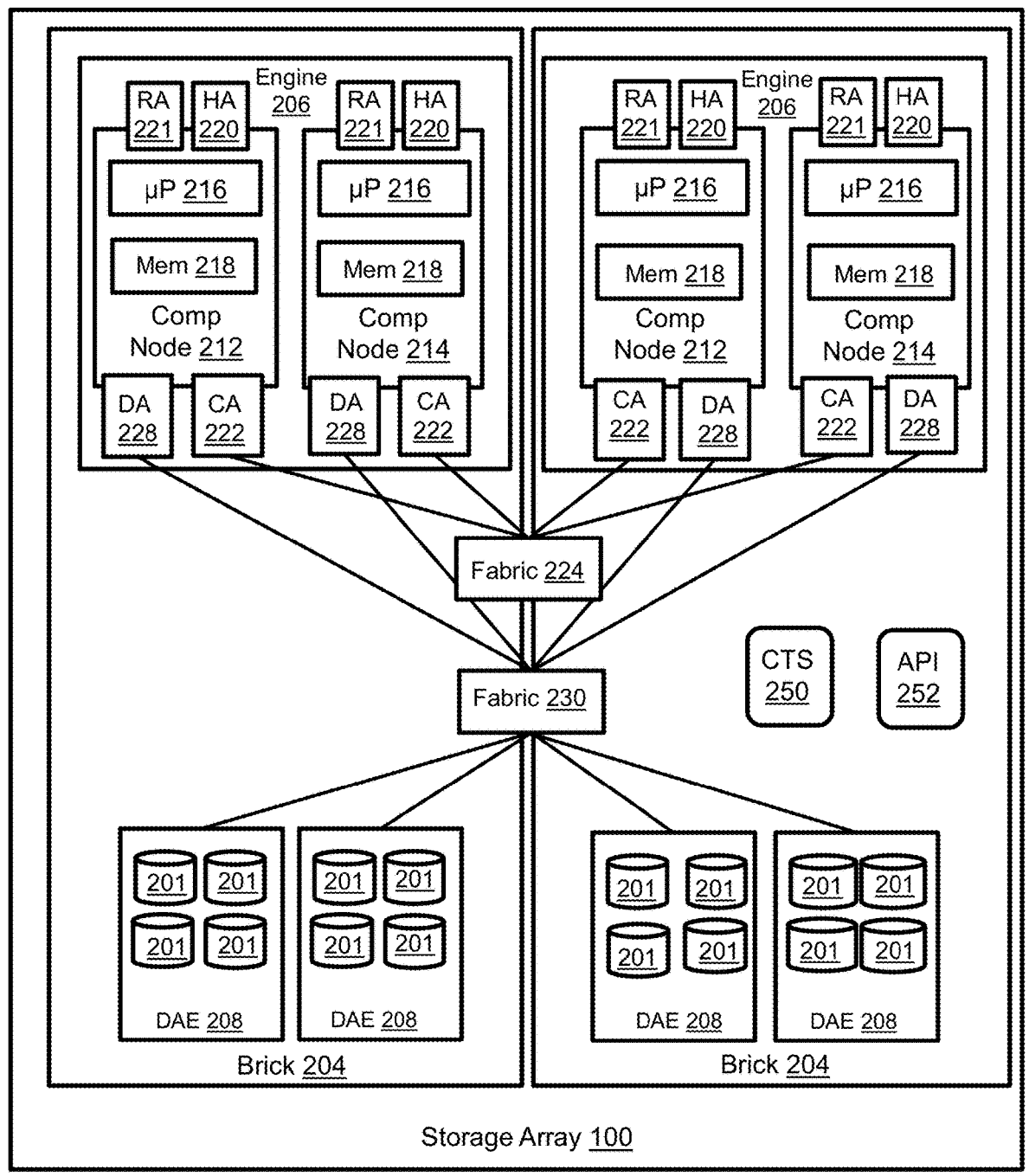
FIG. 2 illustrates the storage array in greater detail.

FIG. 2 illustrates the storage array 100 in greater detail. The storage array 100 includes one or more bricks 204. Each brick includes an engine 206 and one or more drive array enclosures (DAEs) 208. Each engine 206 includes a pair of interconnected compute nodes 212, 214 that are arranged in a failover relationship and may be referred to as "storage directors." Although it is known in the art to refer to the compute nodes of a SAN as "hosts," that naming convention is avoided in this disclosure to help distinguish the network server hosts from the compute nodes 212, 214. Nevertheless, the host applications could run on the compute nodes, e.g. on virtual machines or in containers. Each compute node includes resources such as at least one multi-core processor 216 and local memory 218. The processor may include central processing units (CPUs), graphics processing units (GPUs), or both. The local memory 218 may include volatile media such as dynamic random-access memory (DRAM), non-volatile memory (NVM) such as storage class memory (SCM), or both. Each compute node includes one or more host adapters (HAs) 220 for communicating with the host servers. Each host adapter has resources for servicing IO commands from the host servers. The host adapter resources may include processors, volatile memory, and ports via which the hosts may access the storage array. Each compute node also includes a remote adapter (RA) 221 for communicating with other storage systems, e.g. for remote mirroring, backup, and replication. Each compute node also includes one or more drive adapters (DAs) 228 for communicating with managed drives 201 in the DAEs 208. Each drive adapter has processors, volatile memory, and ports via which the compute node may access the DAEs for servicing IOs. Each compute node may also include one or more channel adapters (CAs) 222 for communicating with other compute nodes via an interconnecting fabric 224. The managed drives 201 include non-volatile storage media such as, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. An interconnecting fabric 230 enables implementation of an N-way active-active backend. A backend connection group includes all drive adapters that can access the same drive or drives. In some implementations every drive adapter 228 in the storage array can reach every DAE via the fabric 230. Further, in some implementations every drive adapter in the storage array can access every managed drive 201.

Referring to FIGS. 1 and 2, data associated with instances of the host application 104 running on the host servers 106, 108, 110 is maintained on the managed drives 201. The managed drives 201 are not discoverable by the host servers 106, 108, 110 but the storage array 100 creates the production device 102 that can be discovered and accessed by the host servers. Without limitation, the production device 102 may be referred to as a logical volume, storage object, source device, production volume, or production LUN, where the logical unit number (LUN) is a number used to identify logical storage volumes in accordance with the small computer system interface (SCSI) protocol. From the perspective of the host servers, the production device 102 is a single drive having a set of contiguous fixed-size logical block addresses (LBAs) on which data used by the instances of the host application resides. However, the host application data is stored at non-contiguous addresses on various managed drives 201. The compute nodes maintain metadata that maps between the production device 102 and the managed drives 201 in order to process IOs from the host servers.

A cloud tethering system (CTS) 250 running on the storage array 100 automatically generates snapsets with metadata in accordance with predefined rules. The rules collectively form a cloud protection policy that may indicate, for example, and without limitation, frequency, retention period, and destination of snapsets for a specific storage group. An example of a cloud protection policy could be a frequency=30 days, retention=1 year, cloud repository=Amazon_S3_Object_Store. In accordance with the example cloud protection policy a new snapset is taken every 30 days and retained in the cloud provider Amazon_S3_Object_Store for a year.

An application programming interface (API) 252 running on the storage array 100 enables the management station 130 to control the storage array. For example, the API 252 may be responsive to representational state transfer (REST) operations to generate commands that cause the compute nodes to perform various operations. As will be described in greater detail below, the API 252 enables the snapset recovery program 128 to cause the storage array to perform operations associated with automated snapset recovery.

Figure 3:
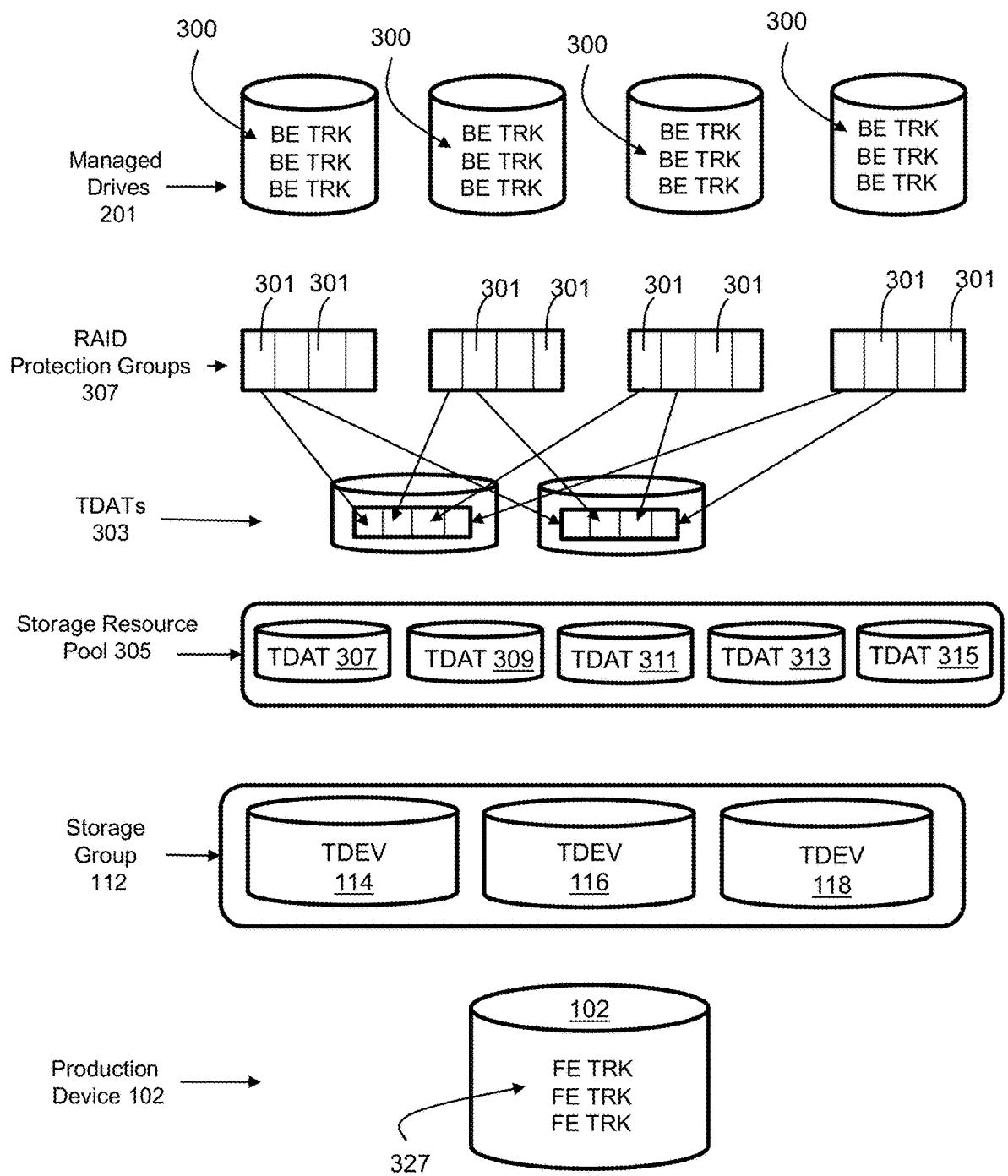
FIG. 3 illustrates layers of abstraction between the managed drives and the production volume.

FIG. 3 illustrates layers of abstraction between the managed drives 201 and the production device 102. The basic allocation unit of storage capacity that is used by the storage array compute nodes to access the managed drives 201 is a back-end track (BE TRK) 300. In other words, the compute nodes do not access the managed drives using allocation units other than BE TRKs. BE TRKs all have the same fixed size which may be an integer multiple of the managed drive sector size. The managed drives 201 are each organized into partitions 301 of equal storage capacity, i.e. every partition has the same fixed size. Each partition 301 may include multiple BE TRKs. Selection of partition storage capacity is a design implementation and, for context and without limitation, may be some fraction or percentage of the capacity of a managed drive equal to an integer multiple of the sector size. Each partition may include a contiguous range of logical addresses. Groups of partitions that include partitions from different managed drives are used to create RAID protection groups 307. The RAID protection groups are distributed on data devices (TDATs) 307, 309, 311, 313, 315. A storage resource pool 305, also known as a "data pool" or "thin pool," is a collection of TDATs of the same emulation and RAID protection group type, e.g. RAID-(8+1). In some implementations all TDATs in a drive group are of a single RAID protection group type and all have the same size (storage capacity). The TDEVs 114, 116, 118 are logical thinly provisioned storage devices that are created using TDATs. The TDATs and TDEVs are accessed using BE TRKs as the allocation unit. Multiple TDEVs 114, 116, 118 are organized into the storage group 112. The production device 102 is created from the storage group 112. Host application data is stored in front-end tracks (FE TRKs) 327, that may be referred to as blocks, on the production device 102. The FE TRKs 327 on the production device 102 are mapped to BE TRKs 300 of the managed drives 201 by metadata maintained by the storage array.

Referring to FIGS. 3 and 4, the snapset data associated with production device 102 includes snapshots 254, 256, 258 of the TDEVs 114, 116, 118 in the storage group 112 associated with the production device 102. The metadata stored with the snapset includes one or more of the storage array ID 260, SG UUID 262, snapshot sizes 264, 266, 268, snapshot names 270, 272, 274, snapshot IDs 276, 278, 280, snapset ID 282, volume WWNs 284, timestamp 286, and opaque metadata including a SG nice name 288, user provider mount point marker 290, and original source volume number 292. The storage array ID is an identifier of the storage array on which the snapped storage group is located. The storage array ID is used in conjunction with the volume meta data to add a volume identifier (tag) to each volume that is recovered so that the user can view each of the recovered volumes and correlate them with the original volume. For example, for "array_id": "000197900228" a sample volume identifier is "source_volume: 000197900228:02E8A" which identifies the storage array and original volume. The SG UUID is a universally unique identifier of the snapped storage group, e.g. unique beyond the storage array. The snapshot sizes indicate the sizes of each of the snapped volumes of the storage group. The snapshot names indicate the names of each of the snapped volumes of the storage group. The snapshot IDs are the storage array locally unique identifiers of each of the snapped volumes of the storage group. The snapset ID is the storage array locally unique identifier of the snapset. The volume WWNs are the worldwide names of snapped volumes of the storage group. The timestamp indicates when the snapset was created. The SG nice name is a human-understandable name given to the snapped storage group. The user provider mount point marker indicates the mount points of the production volume, e.g. the host servers. The original source volume number identifies the production device. Additional attributes may be used to create the new storage group (application) to be an exact copy of the original. A storage resource pool ID srp_id enables the same SRP to be selected if available. A service level obligation ID slo_base_id enables the same service level to be selected if available. User-defined tags from the original storage group are applied to the new storage group. Storage group volume information sg_volume_info includes the hierarchy of the original storage group, including whether it was cascaded or standalone and the breakdown of the parent child relationships if applicable.

Figure 5:
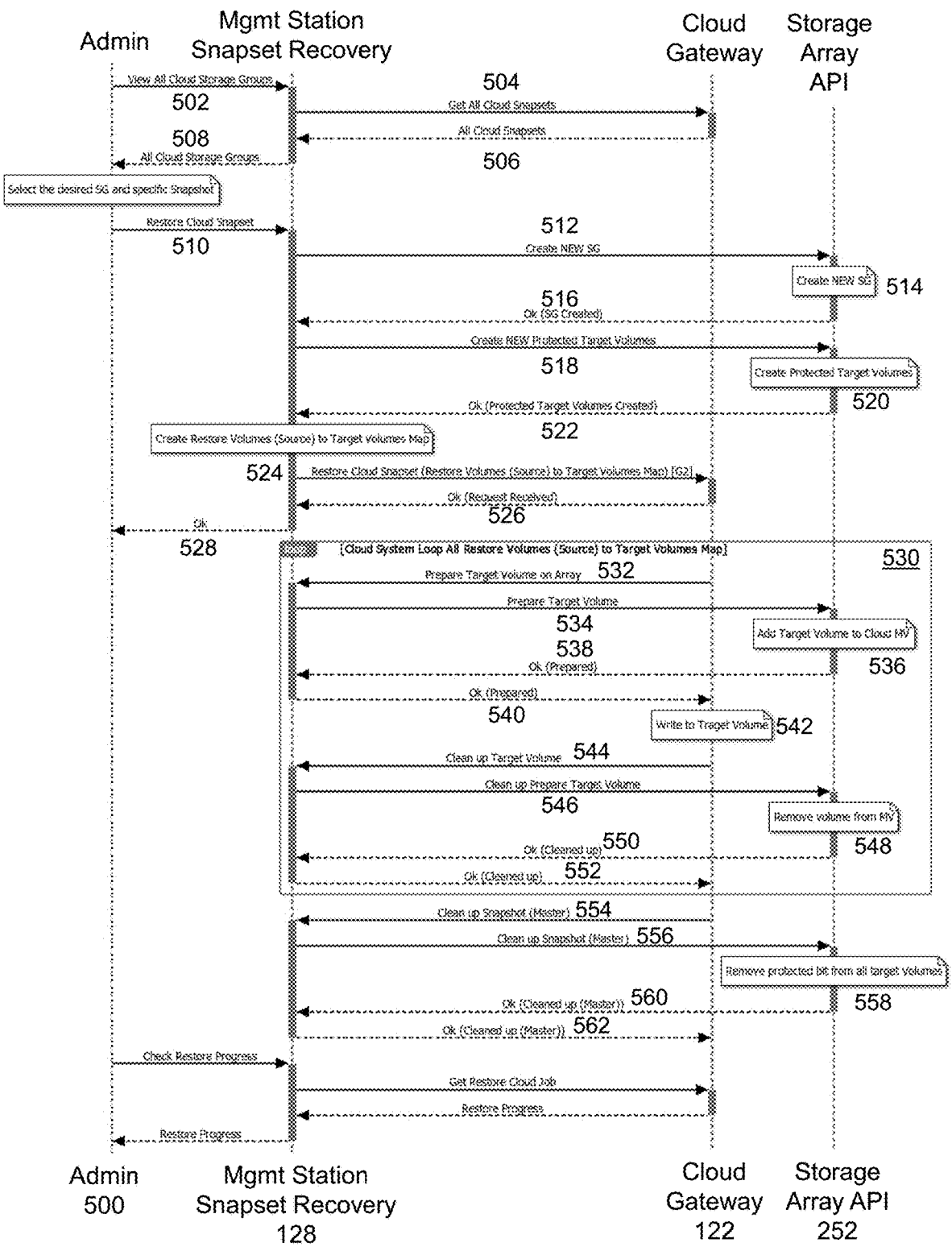
FIG. 5 illustrates steps associated with recovery of the snapset.

FIG. 5 illustrates steps associated with recovery of the snapset. In step 502 a storage admin 500 or another user enters a command to the snapset recovery program 128 to view all cloud storage groups. In response, the snapset recovery program sends a command to the cloud gateway 122 in step 504 to get a catalog of all cloud snapsets stored on the cloud storage. The cloud gateway returns the catalog of all cloud snapsets to the snapset recovery program in step 506 and all storage groups are presented to the storage admin in step 508. The storage admin selects a specific cloud snapset from the catalogue and initiates a recovery of the selected snapset to the current storage array in step 510. The storage admin provides the following information in step 510: the new storage group name, the desired storage resource pool, and the desired service level obligation (SLO). In response, the snapset recovery program sends a command to the storage array API in step 512 to create the new storage group with the specified name. The API causes the storage array to create the new storage group with that name in step 514. The API returns an ACK to the snapset recovery program in step 516 to indicate that the new storage group has been created. The storage group is modified to enable the UUID and the snapset recovery program sends a command to the storage array API to create a number of recovery devices (new protected target volumes that are TDEVs) matching the TDEV snapshot sizes as per the snapset metadata in step 518. The API causes the new protected target volumes to be created in step 520 and returns an ACK to the snapset recovery program in step 522. The device names of the new target volumes may include the source volume to facilitate identification, e.g. "00123_Cloud_Source_Volume." The snapset recovery program sends a request to the storage array API to create a restore volumes (source) to target volumes mapping in step 524 and an ACK is returned to the snapset recovery program in step 526. The snapset recovery program then presents a ready message to the storage admin in step 528. A series of steps is then implemented for each volume (TDEV) that is restored in a loop 530. A command to prepare the target volume on the storage array is sent from the cloud gateway to the snapset recovery program in step 532. The snapset recovery program then sends a command to the API to prepare the target volume in step 534 and the API causes the storage array to add the target volume to the cloud masking view (MV) in step 536 and returns an ACK in step 538. The masking view provides or removes access to a device from the host by adding or deleted a device from the masking view respectively. The snapset recovery program sends a message to the cloud gateway indicating that the target volume is prepared in step 540. The cloud gateway then writes to the target volume in step 542. When the data has been written from the cloud to the target volume on the storage array the cloud gateway sends a clean up target volume message to the snapset recovery program in step 544, in response to which the snapset recovery program signals to the API in step 546 and the target volume is removed from MV in step 548. The API then sends a clean up ACK to the snapset recovery program in step 550 and a corresponding ACK is sent from the snapset recovery program to the cloud gateway in step 552. When all of the snapped volumes have been written to the target volumes and cleaned up the cloud gateway sends a master cleanup command to the snapset recovery program in step 554. The snapset recovery program sends a corresponding command to the API in step 556 which causes the storage array to unprotect the target volumes in step 558. Master cleanup ACKs are sent from the API to the snapset recovery program and from the snapset recovery program to the cloud gateway in steps 560, 562. At any point in time the storage admin may enter a command to check restore progress, in response to which the snapset recovery program signals to the cloud gateway and the cloud gateway returns an indication of restore progress.

Although advantages should not be viewed as limiting the invention, the described snapset object, metadata and automated snapset recovery technique can be accomplished in less time and with less chance of error than prior techniques. Recovering application images from heterogenous cloud repositories has previously been a multi-step process requiring numerous error-prone admin inputs. Typical steps include tracking of multiple volumes and corresponding snaps associated with an application image, tracking the snapshot image that has the mount point, tracking the number of volumes in the application image, tracking the size of the all the volumes in the application image and creating the exact sizes of target volumes, provisioning storage for the space required for recovery, pairing a volume to a corresponding snapshot image, generating a recovery job for every snapshot on a volume by volume basis, and tracking the progress of all the recovery jobs. The complexity and likelihood of error increases as the number of snapped volumes associated with the application image increases. Further, volumes for which recovery has completed are without practical use until the entire application image is recovered.

The described snapset object, metadata and automated snapset recovery technique is also advantageously node independent. In other words, an application image can be recovered to any storage array because the snapset metadata provides the information required by the snapset recovery program to manage recovery. The technique is not reliant on the snapset metadata being maintained in the original storage array and the application image is not limited to being recovered on the original storage array.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method for creating and recovering an application image, comprising:
   with a storage array:
      creating a snapshot of each of a plurality of devices of a storage group associated with a production device on which active application data is logically stored, thereby creating a plurality of the snapshots, each of the snapshots representing device state at a same point in time;
      creating metadata that indicates associations between ones of the snapshots and ones of the devices on which the active application data is stored; and
      creating a snapset comprising all the snapshots and the metadata;
   with a cloud storage system:
      storing the snapset;
   with a third network node:
      using the snapset metadata to automatically create new devices on which to recover the snapshots on a selected storage array; and
      using the snapset metadata to cause the snapshots to be automatically written from the cloud storage system to the new devices on the selected storage array.

2. The method of claim 1 wherein creating metadata comprises including storage array ID, storage group UUID, snapshot sizes, snapshot names, snapshot IDs, snapset ID, volume WWNs, and a timestamp.

3. The method of claim 1 wherein creating metadata comprises including a storage group nice name, user provider mount point marker, and original source volume number.

4. The method of claim 1 comprising the third network node sending a command to the cloud storage system to get a catalog of all cloud snapsets stored on the cloud storage system.

5. The method of claim 1 comprising the third network node automatically sending a command to the selected storage array to create a new storage group for the new devices.

6. The method of claim 5 comprising the third network node automatically sending a command to the selected storage array to create the new devices as protected recovery devices that equal in number the devices of the storage group associated with the production device on which active application data is logically stored.

7. The method of claim 6 comprising the third network node automatically sending a command to the selected storage array to unprotect the new devices after the snapshots are written from the cloud storage system to the new devices on the selected storage array.

8. A storage system, comprising:
a storage array configured to create a snapshot of each of a plurality of devices of a storage group associated with a production device on which active application data is logically stored, thereby creating a plurality of the snapshots, each of the snapshots representing device state at a same point in time, the storage array further configured to create metadata that indicates associations between ones of the snapshots and ones of the devices on which the active application data is stored and create a snapset comprising all the snapshots and the metadata;
a cloud storage system configured to store the snapset; and
a third network node configured to use the snapset metadata to automatically create new devices on which to recover the snapshots on a selected storage array and use the snapset metadata to cause the snapshots to be automatically written from the cloud storage system to the new devices on the selected storage array.

9. The storage system of claim 8 wherein the metadata comprises storage array ID, storage group UUID, snapshot sizes, snapshot names, snapshot IDs, snapset ID, volume WWNs, and a timestamp.

10. The storage system of claim 8 wherein the metadata comprises a storage group nice name, user provider mount point marker, and original source volume number.

11. The storage system of claim 8 wherein the third network node is configured to send a command to the cloud storage system to get a catalog of all cloud snapsets stored on the cloud storage system.

12. The storage system of claim 8 wherein the third network node is configured to automatically send a command to the selected storage array to create a new storage group for the new devices.

13. The storage system of claim 12 wherein the third network node is configured to automatically send a command to the selected storage array to create the new devices as protected recovery devices that equal in number the devices of the storage group associated with the production device on which active application data is logically stored.

14. The storage system of claim 13 wherein the third network node is configured to automatically send a command to the selected storage array to unprotect the new devices after the snapshots are written from the cloud storage system to the new devices on the selected storage array.

15. A computer-readable storage medium storing instructions that when executed by a computer cause the computer to perform a method for using a computer system to create and recover an application image, the method comprising:
with a storage array:
creating a snapshot of each of a plurality of devices of a storage group associated with a production device on which active application data is logically stored, thereby creating a plurality of the snapshots, each of the snapshots representing device state at a same point in time;
creating metadata that indicates associations between ones of the snapshots and ones of the devices on which the active application data is stored; and
creating a snapset comprising all the snapshots and the metadata;
with a cloud storage system:
storing the snapset;
with a third network node:
using the snapset metadata to automatically create new devices on which to recover the snapshots on a selected storage array; and
using the snapset metadata to cause the snapshots to be automatically written from the cloud storage system to the new devices on the selected storage array.

16. The computer-readable storage medium of claim 15 wherein creating metadata comprises including storage array ID, storage group UUID, snapshot sizes, snapshot names, snapshot IDs, snapset ID, volume WWNs, and a timestamp.

17. The computer-readable storage medium of claim 15 wherein creating metadata comprises including a storage group nice name, user provider mount point marker, and original source volume number.

18. The computer-readable storage medium of claim 15 comprising the third network node sending a command to the cloud storage system to get a catalog of all cloud snapsets stored on the cloud storage system.

19. The computer-readable storage medium of claim 15 comprising the third network node automatically sending a command to the selected storage array to create a new storage group for the new devices.

20. The computer-readable storage medium of claim 19 comprising the third network node automatically sending a command to the selected storage array to create the new devices as protected recovery devices that equal in number the devices of the storage group associated with the production device on which active application data is logically stored.

* * * * *